(12) United States Patent
Nair et al.

(10) Patent No.: US 11,973,664 B2
(45) Date of Patent: Apr. 30, 2024

(54) SYSTEM AND APPROACH FOR REMOTE ROOM CONTROLLER AND DEVICE DIAGNOSTICS AND HEALTH MONITORING

(71) Applicant: Honeywell International Inc., Charlotte, NC (US)

(72) Inventors: Ajay Nair, Bangalore (IN); Upender Paravastu, Bangalore (IN); Jijji Ramanathan, Bangalore (IN); Mallikarjuna Nonayinakere Sugandharajappa, Bangalore (IN); James Barrette, Ashburnham, MA (US); Liwen Yu, Acton, MA (US); Christopher Martin, Sterling, MA (US); Wei Hua, Acton, MA (US); Robert Klamka, Westford, MA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 226 days.

(21) Appl. No.: 17/396,339

(22) Filed: Aug. 6, 2021

(65) Prior Publication Data
US 2021/0367859 A1 Nov. 25, 2021

Related U.S. Application Data

(63) Continuation of application No. 14/709,333, filed on May 11, 2015, now abandoned.

(51) Int. Cl.
*H04L 41/22* (2022.01)
*H04L 41/044* (2022.01)
*H04L 41/0695* (2022.01)
*H04L 43/0817* (2022.01)

(52) U.S. Cl.
CPC ............ *H04L 41/22* (2013.01); *H04L 41/044* (2013.01); *H04L 41/0695* (2013.01); *H04L 43/0817* (2013.01)

(58) Field of Classification Search
CPC ... H04L 41/22; H04L 41/044; H04L 41/0695; H04L 43/0817
See application file for complete search history.

(56) References Cited

U.S. PATENT DOCUMENTS 5,400,246 A 3/1995 Wilson et al.
5,490,134 A 2/1996 Fernandes et al.
6,097,995 A 8/2000 Tipton et al.
(Continued)

*Primary Examiner* — Justin S Lee
(74) *Attorney, Agent, or Firm* — Seager, Tufte & Wickhem, LLP

(57) ABSTRACT

The disclosure reveals a system and approach for remote health monitoring and diagnostics of room controllers, networks and devices. A master room controller may be used to open a system health page or a diagnostic page for other controllers. A system health page may provide an overview of virtually all of the other room controllers. A tool of the present system may be used to trouble shoot issues remotely at another room controller in lieu of doing a visit to the respective room controller. A user may navigate from the system health page to virtually any place on the room controller to diagnose issues. The navigation may be done by hyper linking from the system health page. The healthy controllers may be hidden from the page so that the unhealthy systems can be viewed in one shot.

17 Claims, 8 Drawing Sheets

(56) References Cited

U.S. PATENT DOCUMENTS

| | | |
|---|---|---|
| 6,480,972 B1 | 11/2002 | Cromer et al. |
| 6,493,616 B1 | 12/2002 | Rossow et al. |
| 7,020,598 B1 | 3/2006 | Jacobson |
| 7,145,457 B2 | 12/2006 | Spitz et al. |
| 7,383,158 B2 | 6/2008 | Krocker et al. |
| 8,121,729 B2 | 2/2012 | Blanc et al. |
| 8,780,726 B2 | 7/2014 | Anglin et al. |
| 9,693,734 B2 | 7/2017 | Horseman |
| 2004/0098148 A1 | 5/2004 | Retlich et al. |
| 2006/0010009 A1 | 1/2006 | Fangman |
| 2007/0219645 A1 | 9/2007 | Thomas et al. |
| 2007/0239351 A1 | 10/2007 | Sherrill et al. |
| 2011/0029102 A1 | 2/2011 | Campney et al. |
| 2014/0282181 A1* | 9/2014 | Declerck .............. A61M 1/02 715/771 |

* cited by examiner

Fig. 3

System Health Summary

☐ Hide Healthy Systems

Search: [       ]

| Room Controller | Location | Primary LAN | | Secondary LAN | | JACE Health | LON1 | LON2 | Device Status |
|---|---|---|---|---|---|---|---|---|---|
| | | IP Address | DHCP | IP Address | DHCP | | | | |
| MIT_RMC_Bldg1 | | 199.63.214.188 | true | | | ○ R | ○ R | ○ Gn | ○ Gn |
| MIT_RMC_Bldg1 | | 199.63.214.188 | true | | | ○ R | ○ R | ○ Gn | ○ Gn |

ADMIN

Poll Interval 5 min

⟳ Refresh 31, 32, 33

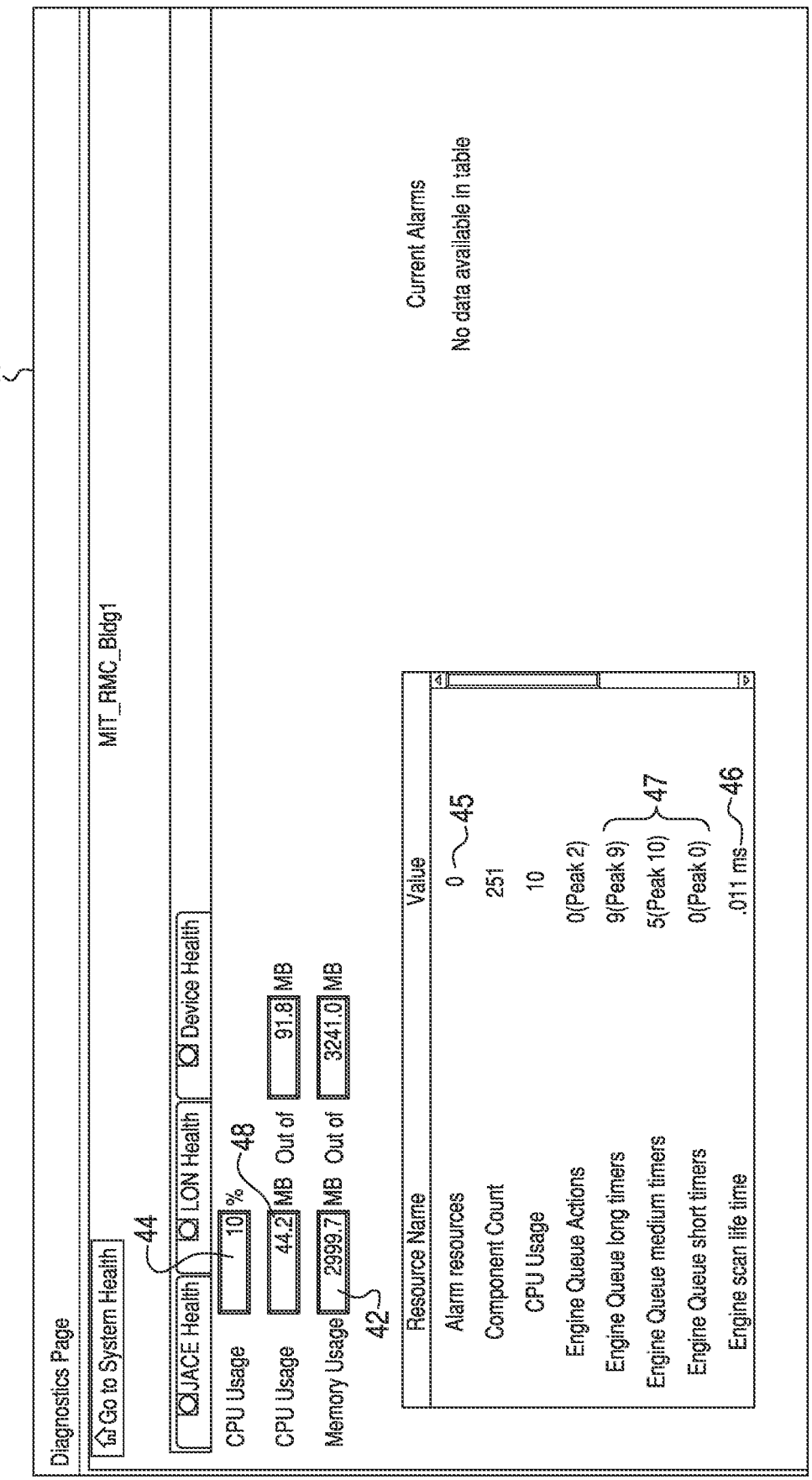

Fig. 6

Diagnostics Page

⌂ Go to System Health    — 52

| ⊙ JACE Health | ⊙ LON Health — 52 | ⊙ Device Health — 53 |

MIT_RMC_Bldg1                                             51

⟲ Refresh    ADMIN ⌂ ▽

LON Card Slot 1

| Property | Value |
|---|---|
| Channel Id | 0 |
| Enabled | true |
| Health Alarm | false |
| Health Down | false |
| Last fail time | 01-Jan 5:30:00.000 AM |
| Last OK time | 01-Jan 5:30:00.000 AM |
| LON Network | LONNetwork1 |
| Neuron Id | 00 00 00 00 00 00 |
| Node | LON1 |
| Program Id | 00 00 00 00 00 00 00 00 |
| State | Unknown |
| Status | Null |

LON Card Slot 2

| Property | Value |
|---|---|
| Channel Id | 0 |
| Enabled | true |
| Health Alarm | false |
| Health Down | false |
| Last fail time | 01-Jan 5:30:00.000 AM |
| Last OK time | 01-Jan 5:30:00.000 AM |
| LON Network | LONNetwork2 |
| Neuron Id | 00 00 00 00 00 00 |
| Node | LON2 |
| Program Id | 00 00 00 00 00 00 00 00 |
| State | Unknown |
| Status | Null |

Fig. 7

Diagnostics Page

⌂ Go to System Health     MIT_RMC_Bldg1     ⟳ Refresh

| ◉ JACE Health | ◉ LON Health | ◉ Device Health |

☐ Hide Healthy Devices

| Device Name | Room | Application | Mode | Error | Alarm |
|---|---|---|---|---|---|
| Hood | DEMO_HoodWithBstrTrks | Hood | ● | ○ | ○ |
| BstrTrk01 | DEMO_HoodWithBstrTrks | BstrTrk | ● | ○ | ○ |
| BstrTrk02 | DEMO_HoodWithBstrTrks | BstrTrk | ● | ○ | ○ |
| BstrTrk03 | DEMO_HoodWithBstrTrks | BstrTrk | ● | ○ | ○ |
| BstrTrk04 | DEMO_HoodWithBstrTrks | BstrTrk | ● | ○ | ○ |
| BstrTrk05 | DEMO_HoodWithBstrTrks | BstrTrk | ● | ○ | ○ |
| Gex | DEMO_HoodWithBstrTrks | Gex | ● | ○ | ○ |
| SccLabCmpt | DEMO_HoodWithBstrTrks | SccLabCmpt | ● | ○ | ○ |

Details for Hood

P/N [ ]     S/N [ ]

Mode     Name     Normal     Unknown

Errors     Name     No data available in table

Alarms     Name     No data available in table

61

SYSTEM AND APPROACH FOR REMOTE ROOM CONTROLLER AND DEVICE DIAGNOSTICS AND HEALTH MONITORING

This application is a continuation of U.S. patent application Ser. No. 14/709,333, filed May 11, 2015. U.S. patent application Ser. No. 14/709,333, filed May 11, 2015, is hereby incorporated by reference.

BACKGROUND

The present disclosure pertains to controllers, and particularly to monitoring of controllers.

SUMMARY

The disclosure reveals a system and approach for remote health monitoring and diagnostics of room controllers, networks and devices. A master room controller may be used to open a system health page or a diagnostic page for other controllers. A system health page may provide an overview of virtually all of the other room controllers. A tool of the present system may be used to trouble shoot issues remotely at another room controller in lieu of doing a visit to the respective room controller. A user may navigate from the system health page to virtually any place on the room controller to diagnose issues. The navigation may be done by hyper linking from the system health page. The healthy controllers may be hidden from the page so that the unhealthy systems can be viewed in one shot.

BRIEF DESCRIPTION OF THE DRAWING

FIG. 3 is a diagram of a system health summary screen;

FIG. 5 is diagram of a screen shot certain properties of an application control engine;

FIG. 6 is a diagram showing a diagnostics page; and

FIG. 7 is a diagram of device tab that may display virtually all devices connected to a network and with error and alarm status.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

A Tridium™ Niagara™ AX Framework may be a base software application to develop a remote room controller diagnostics page and a tool for troubleshooting the devices. Further, the present system and approach may have a tool that may be used to troubleshoot issues remotely and thus a technician may be required to visit a customer site to troubleshoot any issues of a device.

Figure 1:
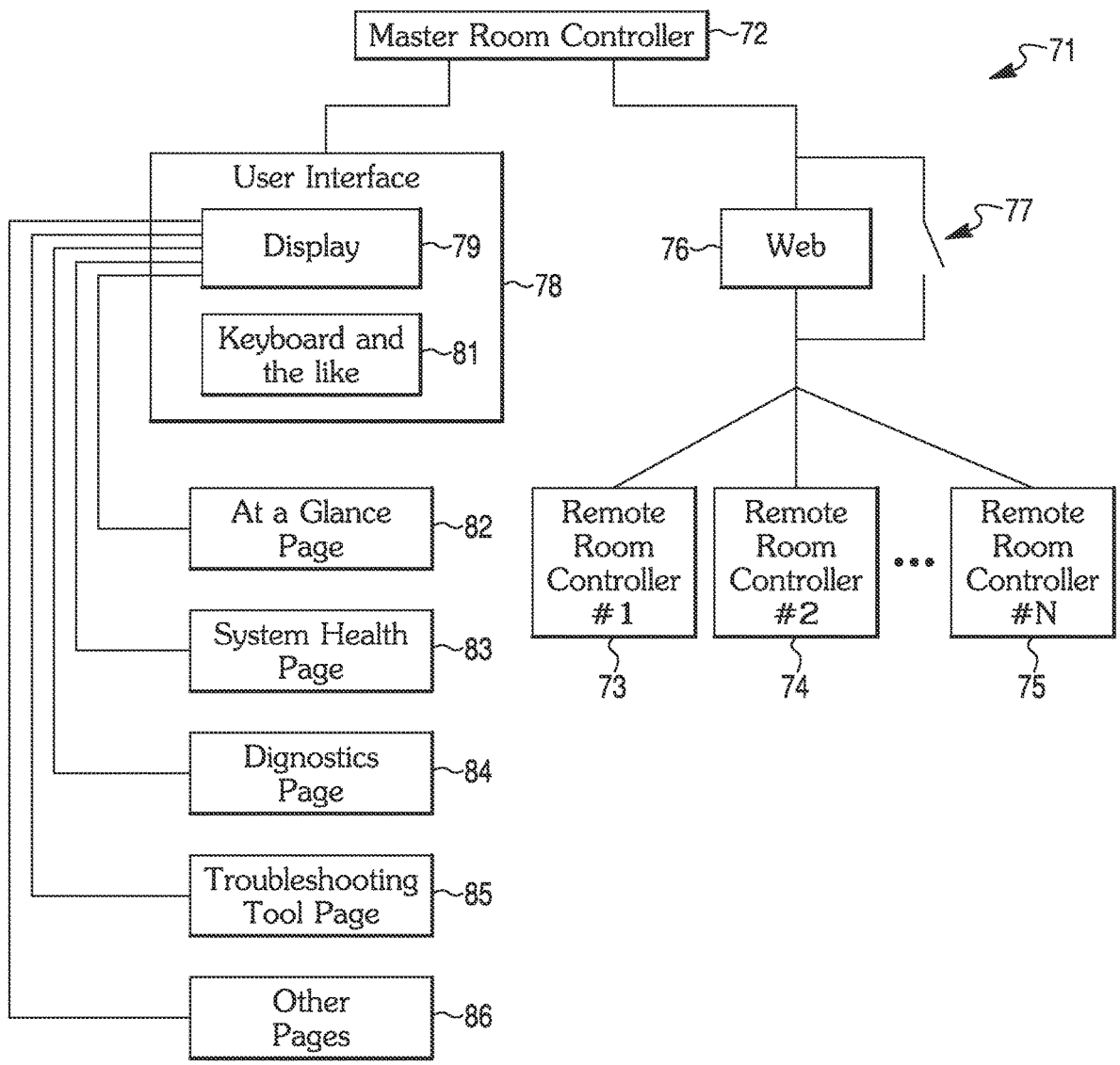
FIG. 1 is a diagram of an illustrative example of a system for remote room controller and device health monitoring.

FIG. 1 is a diagram 71 of an example layout of a system for remote controller and device health monitoring. A master room controller 72 may be connected to one or more remote room controllers 73, 74 and 75. A connection between controller 72 and controllers 73-75 may be via a web 76, a direct wire connection 77 or a wireless connection. Master room controller 72 may have a user interface 78 that is integral to controller 72 or apart from controller 72. User interface 78 may have a display 79 and keyboard 81 and so forth. Display 79 could be a touch screen for selection, response and input. Several screens of pages may be shown on display 79. The screens may incorporate an at-a-glance page 82, a system health page 83, a diagnostics page 84, a troubleshooting page 85, and other pages 86, as desired.

A system health summary screen 31 revealed in a diagram of FIG. 3 may be a web page to provide an "at-a-glance" overview of system-wide health status. The system health summary screen 31 may indicate the health of each room controller. Examples of controllers noted may be MIT RMC Bldg 1 and MIT RMC Bldg 2. MIT RMC Bldg 1 may be noted in FIGS. 3 and 5-7.

The present disclosure, such as a system health summary screen to indicate the health of each room controller, may help for instance, a Phoenix Controls' technician to remotely check, for example, the following items: 1) a status of JACE™ (Java application control engine); 2) a status of Lon Networks in the JACE; 3) a status of devices in the one or more Lon™ networks; 4) a hyperlink of the JACE to allow a user to navigate to a detailed diagnostics screen of the JACE; and 5) mode error and alarm conditions.

A Phoenix™ technician may launch a system health page directly from a Phoenix workbench room controller. This controller may be a master room controller. A master room controller may be a master of all other room controllers, which has a direct connection to other room controllers. Each of the room controllers may have a unique IP address assigned to it which can let a user open a system health page or a diagnostics page.

The system health page may provide an overview of virtually all room controllers for that Phoenix job as shown in a screen shot in a diagram 31 of FIG. 3. For an offline job, each room controller may be running in a simulated unique port. If the room controller has a dual LAN card, both of the card details may be displayed.

The categories 32 of information in screen 31 may be a room controller, location, primary LAN with IP address and DHCP (dynamic host configuration protocol), a secondary LAN with IP address and DHCP, JACE health, LON status with LON 1 and LON 2, and device status. Example indicators 33 may be either green (Gn), red (R) or gray (Gy).

Figure 2:
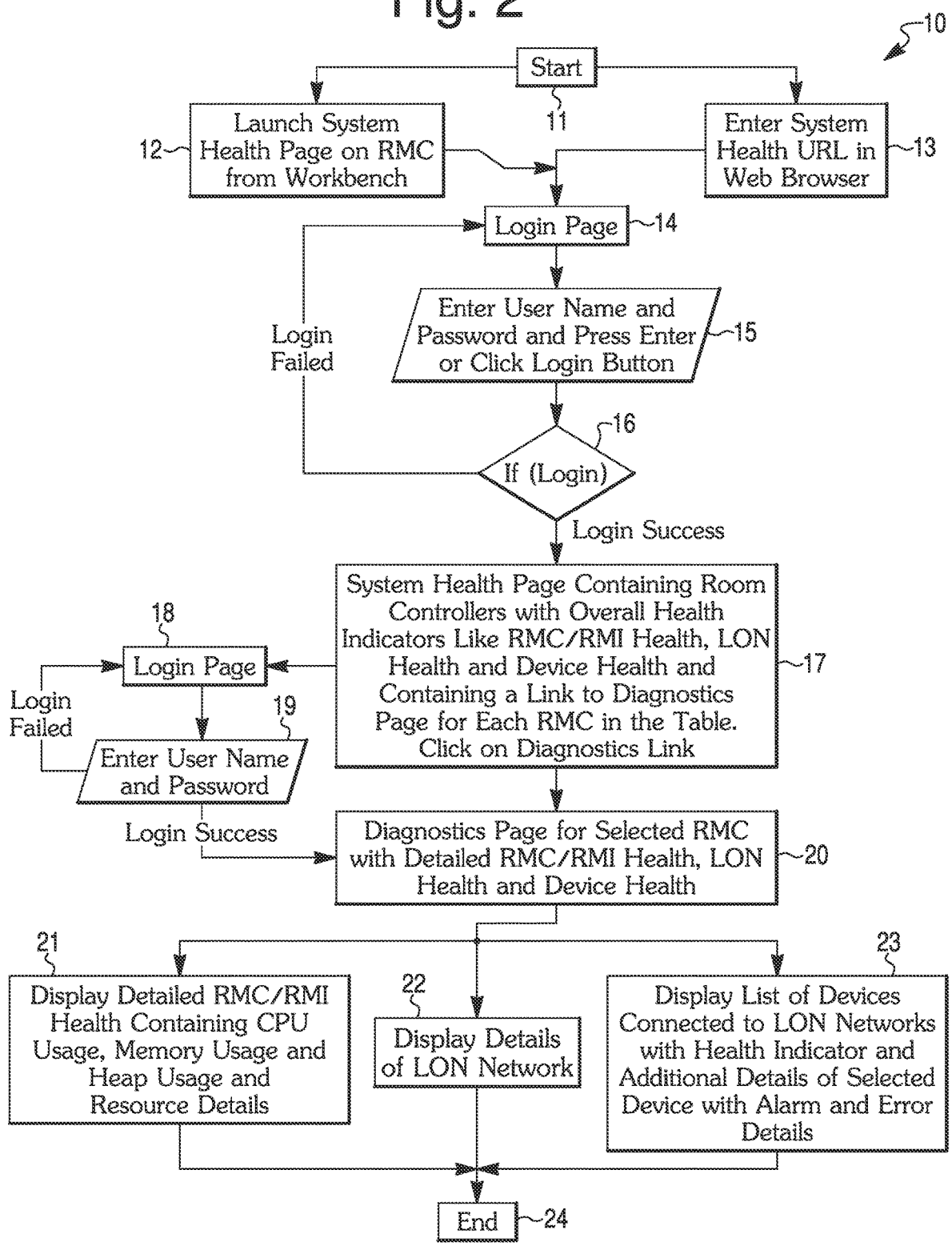
FIG. 2 is a diagram of an approach for obtaining health and diagnostics of room controllers, networks and devices.

FIG. 2 is a diagram of an example 10 of the present approach. A start at symbol 11 may proceed to one of several approaches which in the present case may be to launch a system health page on an RMC from a workbench at symbol 12, or to enter the via the system health URL in a web browser at symbol 13. From either symbol 12 or 13, a login page at symbol 14 may appear for entry of a user name and password. Then, one may press an enter button or click on a login button at symbol 15. A result may be indicated at symbol 16, which may be login failed or of login success. A login failed may have the user return to the login page at symbol 14 or quit the attempt.

With login success to symbol 17, there may be a system health page containing room controllers with overall health indicators like RMC/RMI health, LON health and device health and containing a link to a diagnostic page for each RMC in the table. Then the link for diagnostics may be clicked.

A logic page may appear at symbol 18 and a user name and password can be entered according to symbol 19. There may be a login failed or a login success. A login failed may have the user return to the logic page at symbol 18 or quit the attempt.

With login success, one may go to symbol 20. There may be a diagnostics page for selected RMC with detailed RMC/RMI health, low health and device health as represented by symbols 21, 22 and 23, respectively. Symbol 21 may indicate a display detailed RMC/RMI health containing CPU usage, memory usage, heap usage, and resource details. Symbol 22 may indicate a display of details about the LON network. Symbol 23 may indicate a display of devices connected to LON networks with a health indication and additional details of a selected device with alarm and error details. Upon review of one or more of the instances of information as revealed in the symbols, one may end the inquiry at symbol 24.

Figure 4:
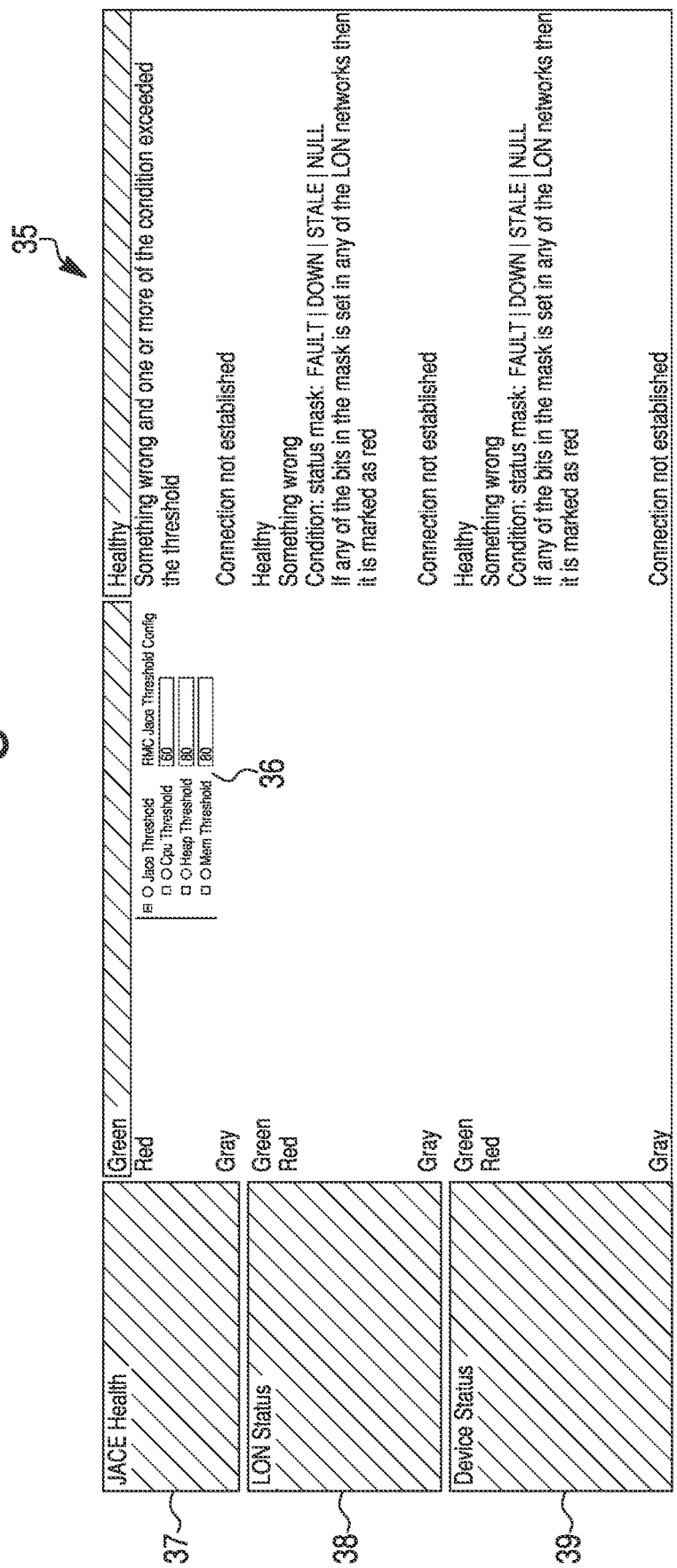
FIG. 4 is a diagram of a summary of conditions for an application control engine health, network status and device status.

FIG. 4 is a diagram of a summary 35 of conditions. As to JACE health 37, a green indication may show a healthy status. A red indication may show that something is wrong or that one or more of the conditions exceeded a threshold. Chart 36 at the top of the diagram of FIG. 4 is shown in a diagram of FIG. 5a. A gray indication may show that a connection has not been established.

As to LON status 38, a green indication may indicate a LON status to be healthy. A red indication may indicate something to be wrong. A condition may be revealed with a status mask of "FAULT|DOWN|STALE|NULL". If any of the bits in the mask is set in any of the Lon networks, then it may be marked as red. Gray may indicate a connection not to be established.

As to device status 39, green indication may reveal a status to be healthy. Red may indicate something to be wrong. A condition may be revealed with a status mask of "FAULT|DOWN|STALE|NULL". If any of the bits in the mask is set in any of the LON devices, then it may be marked as red. A gray indication may indicate a connection not established.

A user may navigate from the system health to any component on the room controller to diagnose the issues. This may be done by hyper linking from the system health page. Also, it may provide the flexibility to hide healthy systems (i.e., no errors or alarms in JACE health, LON status, and device status), so that one can view unhealthy systems in a shot. A polling interval may be set which can poll based on the interval (e.g., 5 minutes) set in a Phoenix workbench.

Figure 5A:
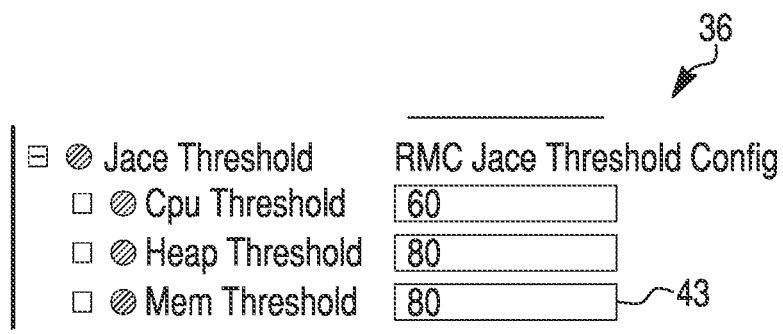
FIG. 5a is a diagram of thresholds related to the application control engine.

A screen shot in a diagram 41 of FIG. 5 may show that the memory usage (marked in red −2999.7) of indicator 42 may have exceeded a threshold defined, i.e., 80 percent in the present example, according to indicator 43 in a diagram 36 of FIG. 5a. The JACE health may display virtually all of the parameters of the room controller like CPU usage, alarm resources, component count, engine queue actions, engine life time, queue timers, heap usage, some of which are noted by indications 44, 45, 46, 47 and 48, respectively, and so forth. Alarms may be generated because of low available files, low disk space, low heap, low memory, and RAM also shown on a dashboard.

FIG. 6 is a diagram 51 showing a diagnostics page. JACE health tab 52 may show various parameters related to health of the component. A LON (Lon) health tab 53 may display virtually all the Lon related parameters such as health, alarm, fail time, status, and so forth. A device tab, for an instance of a hood, may display virtually all of the Lon devices connected to the Lon network and its error and alarm status as shown in a diagram 61 of FIG. 7. An error value may be read from "nvoPhxStatus/nvoAppStatus" of a Niagara property and an alarm may be read from "nvoAlarmStatus".

To recap, a system for remote room controller monitoring, may incorporate one or more remote room controllers, a master room controller connected to the one or more remote room controllers, and a user interface connected to the master room controller. The user interface may be used to obtain an at-a-glance overview of system-wide issues to provide an at-a-glance overview of a system-wide health status of the one or more remote room controllers. The user interface may be used to obtain a diagnostics page corresponding to a selected remote room controller. The user interface may be used to pull up a tool to remotely troubleshoot issues of the selected remote room controller in accordance with issues indicated in the diagnostics page corresponding to the selected remote room controller.

The user interface may be used to go to a website to get the at-a-glance overview of system-wide issues and go to the website to troubleshoot any issues as indicated in the at-a-glance overview of system-wide issues in the one or more remote room controllers.

The system health summary screen may reveal the at-a-glance overview of system-wide issues to indicate health of each remote room controller for helping a technician to remotely check one or more health items of each remote room controller.

The one or more health items may be selected from a group consisting of a status of an application control engine, a status of one or more networks in the application control engine, a status of devices in the one or more networks, and a hyperlink of the application control engine to allow a user to navigate to a diagnostics screen of the application control engine, mode, errors, and/or alarm conditions.

The system may be launched from a health page for a remote room controller from a workbench at the master room controller.

The health page may incorporate one or more remote room controllers with overall health indicators remote room controller health, network health, and/or device health. The system health page may incorporate a link to a diagnostics page for each remote room controller in a table. Upon clicking the link, the diagnostics page for selected remote room controller health, network health and/or a device health may come up on the display.

The remote room controller health on the diagnostics page revealed on the display may incorporate one or more details selected from a group consisting of central processing unit usage, memory usage, heap usage and/or resources.

The display may show a list of devices connected to one or more networks having a health indicator and details of one or more devices on the list with alarm and error details.

The display may show details of the one or more networks.

The mode, error and alarm details for a device may be highlighted with an indicator for showing a first, second or third color. The first color may indicate that something is wrong and one or more of the conditions exceed a threshold. The second color may indicate that a connection has not been established. The third color may indicate a healthy condition.

An approach for health monitoring and diagnosis, may incorporate developing a diagnostics page for one or more remote room controllers, clicking on a link to obtain for one or more remote room controllers the diagnostics page on a display of a processor, developing a tool for troubleshooting an issue with a device of the one or more remote room controllers, and entering into a system to get to a health page incorporating one or more remote room controllers having overall health indicators. The diagnostics page may show the remote room controllers having overall health indicators.

The overall health indicators may reveal a health of one or more items of a group consisting of remote room controllers, networks, and devices.

The diagnostics page may be for a selected remote room controller. The diagnostics page may incorporate details of remote room controller health, network health and/or device health for a selected remote room controller.

Details of the remote room controller health may incorporate one or more items of a group consisting of central computing unit usage, memory usage, heap usage and/or resource details.

A list of devices may be connected to one or more networks with a health indicator and additional details of a selected device with mode, alarm and/or error details displayed.

A system having monitoring and diagnostics may incorporate one or more remote room controllers, a master room controller connected to the one or more remote room controllers, and a display with an input mechanism connected to the master room controller.

The master room controller may incorporate an application to develop a remote room controller health page and a diagnostic page, and a tool to remotely troubleshoot issues based on the diagnostics page of a device at a remote room controller.

The display may show a screen that provides a system-wide health status of the one or more remote controllers.

Each of the one or more remote room controllers may incorporate one or more items selected from a group consisting of an application control engine, networks connected to and in the application control engine, and a hyperlink of the application control engine to allow a user to navigate to a detailed diagnostics screen of the application control engine, modes, errors, and/or alarm conditions.

A user may remotely check one or more items of a group consisting of the application control engine, networks in the application control engine, and the hyperlink of the application control engine of the application control engine to allow a user to navigate to the detailed diagnostics screen of the application control engine, modes, errors, and/or alarm conditions.

Each of the one or more remote room controllers may have a unique internet protocol (IP) address. A user can use an internet protocol address at the master room controller to open a system health page or a diagnostics page for a remote room controller having the internet protocol address. The user may troubleshoot a device having a property issue spotted with the diagnostics page.

Any publication or patent document noted herein is incorporated by reference to the same extent as if each individual publication or patent was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for remote room controller monitoring, comprising:
    one or more remote room controllers each having at least one component having a set of parameters related to health of the at least one component;
    a master room controller located remote from the one or more remote room controllers, the master controller connected to the one or more remote room controllers and configured to:
        poll the at least one component of each of the one or more remote room controllers at a polling interval to obtain the set of parameters, wherein polling interval is settable by a user;
        detect an overall health of each of the one or more remote room controllers based on the set of parameters;
        detect a component health of each of the at least one component based on the set of parameters;
        determine which of the one or more remote room controllers are healthy and which of the one or remote room controller are not healthy based on the set of parameters;
        generate a system health page, wherein the system health page displays the overall health of each of one or more remote room controllers that are determined to be not healthy and hiding the overall health of each of the remote room controllers that are determined to be healthy; and
        generate a selected remote room controller health page, wherein the selected remote room controller health page is based on the component health of the selected remote room controller from the one or more remote room controllers; and
    a user interface connected to the master room controller and having a display, wherein the user interface is configured to:
        display the generated system health page and the generated selected remote room controller health page on the display; and
        receive a selection of the selected remote room controller.

2. The system of claim 1, wherein the master room controller is further configured to generate a login page and the user interface is further configured to display the generated login page on the display.

3. The system of claim 1, wherein the system health page comprises identifiers for each of the one or more remote room controllers that are determined to be not healthy with overall health indicators indicating remote room controller health, network health, and device health.

4. The system of claim 3, wherein the system health page incorporates a link to a diagnostics page for each remote room controller that is determined to be not healthy in a table.

5. The system of claim 4, wherein upon clicking the link displayed on the display, the remote room controller receives the selection of the selected remote room controller and in response, the remote room controller generates a login page displayed on the display.

6. The system of claim 1, wherein a selected remote room controller health page comprises one or more of central processing unit usage, memory usage, heap usage and resources.

7. The system of claim 5, wherein the selected remote room controller health page displays a list of components connected to one or more networks having a health indicator and details of one or more components on a list with alarm and error details.

8. The system of claim 7, wherein the selected remote room controller health page displays details of the one or more networks.

9. The system of claim 1, wherein:
mode, error and alarm details for the one or more remote room controllers are highlighted with an indicator for showing a first color, a second color, or a third color;
the first color indicates that something is wrong and one or more conditions exceed a threshold;
the second color indicates that a connection has not been established; and
the third color indicates a healthy condition.

10. A method for health monitoring and diagnosis, comprising:
polling at least one component of each of one or more remote room controllers to obtain a set of parameters, wherein the polling is performed by a master room controller at a polling interval that is set by a user via a workbench running on the master room controller, wherein the master room controller has a direct connection to each of the one or more remote room controllers;
the master room controller detecting an overall health of each of the one or more remote room controllers based on the set of parameters;
the master room controller detecting a component health of each of at least one component based on the set of parameters;
the master room controller receiving, via a user interface of the workbench, a first correct login comprising a first user name of a user and a first password for the user;
the master room controller generating a system health page in response to receiving the first correct login, wherein the system health page is based on the overall health of each one or more remote room controllers;
displaying the system health page on the user interface of the workbench;
receiving, via the user interface of the workbench, a selection of a remote room controller from the one or more remote room controllers;
receiving, via the user interface of the workbench, a second correct login comprising a second user name of the user and a second password for the user;
generating a selected remote room controller health page in response to receiving the second correct login, wherein the selected remote room controller health page is based on the component health for a selected remote room controller; and
displaying the selected remote room controller health page on the user interface of the workbench.

11. The method of claim 10, wherein the first user name is different from the second user name.

12. The method of claim 10, wherein the first user name is the same as the second user name.

13. The method of claim 12, wherein the first password and the second password are different.

14. The method of claim 10, wherein details of the system health page include one or more of central computing unit usage, memory usage, heap usage and resource details.

15. The method of claim 13, wherein the selected remote room controller health page includes a health indicator and additional details of the selected remote room controller with mode, alarm and error details displayed.

16. A system having monitoring and diagnostics capabilities comprising:
one or more remote room controllers each having at least one component having a set of parameters related to health of the at least one component;
a master room controller connected to the one or more remote room controllers; and
a display with an input mechanism connected to the master room controller; and
wherein the master room controller is configured to:
execute a workbench;
poll the at least one component of the one or more remote room controllers at a polling interval to obtain the set of parameters, wherein polling interval is set by a user using the input mechanism via the workbench running on the master room controller;
detect an overall health of each of the one or more remote room controllers based on the set of parameters;
detect a component health of each of the at least one component based on the set of parameters;
in response to a user interacting with the workbench, receive via the input mechanism a first correct login comprising a first user name of a user and a first password for the user;
generate a system health page, in response to receiving the first correct login, wherein the system health page is based on the overall health of each of the one or more remote room controllers;
display via workbench the system health page on the display;
in response to a user interacting with the workbench, receive via the input mechanism a selection of a remote room controller from the one or more remote room controllers;
in response to a user interacting with the workbench, receive via the input mechanism a second correct login comprising a second user name of the user and a second password for the user;
generate a selected remote room controller health page, in response to receiving the second correct login, wherein the selected remote room controller health page is based on the component health for a selected remote room controller; and
display via workbench the selected remote room controller health page on the display.

17. The system of claim 16, wherein:
the first user name is different from the second user name; and
the workbench running on the master room controller is further configured to generate a login page and the display is further configured to display the generated login page.

* * * * *